United States Patent
Banerjee et al.

(10) Patent No.: US 10,754,541 B2
(45) Date of Patent: Aug. 25, 2020

(54) EXPANDABLE DRAWING SURFACE

(71) Applicant: Adobe Inc., San Jose, CA (US)

(72) Inventors: Sriraj Banerjee, Bangalore (IN); Karnati Penchala Charith Chowdary, Bangalore (IN); Ashish Garg, Bangalore (IN)

(73) Assignee: Adobe Inc., San Jose, CA (US)

( * ) Notice: Subject to any disclaimer, the term of this patent is extended or adjusted under 35 U.S.C. 154(b) by 733 days.

(21) Appl. No.: 14/858,214

(22) Filed: Sep. 18, 2015

(65) Prior Publication Data

US 2017/0083224 A1   Mar. 23, 2017

(51) Int. Cl.
| | |
|---|---|
| G06F 3/0488 | (2013.01) |
| G06F 3/0481 | (2013.01) |
| G06F 3/0485 | (2013.01) |
| G06F 3/14 | (2006.01) |
| G06F 3/0483 | (2013.01) |
| G09G 5/34 | (2006.01) |

(52) U.S. Cl.
CPC ........ G06F 3/04883 (2013.01); G06F 3/0481 (2013.01); G06F 3/0483 (2013.01); G06F 3/0485 (2013.01); G06F 3/0488 (2013.01); G06F 3/14 (2013.01); G09G 5/346 (2013.01); G09G 2360/121 (2013.01)

(58) Field of Classification Search
CPC .. G06F 3/04883; G06F 3/0485; G06F 3/0488; G06F 3/04842; G06F 3/0481; G06F 17/242; G06F 3/0483; G06F 12/02; G06F 12/00; G06F 3/0608; G06F 12/0862; G09G 5/346

USPC ................... 715/773; 711/170, 154
See application file for complete search history.

(56) References Cited

U.S. PATENT DOCUMENTS

| | | | | |
|---|---|---|---|---|
| 7,047,387 | B2* | 5/2006 | Goodsell | G06F 12/0871 711/118 |
| 2003/0076539 | A1* | 4/2003 | Nakajima | G06K 9/00456 358/2.1 |
| 2006/0176307 | A1* | 8/2006 | Lagercrantz | G06F 3/0483 345/473 |

(Continued)

OTHER PUBLICATIONS

Authors et. al.: Disclosed Anonymously, Removing Non-Visible User Interface Elements, Mar. 20, 2013, IP.com, pp. 1-18 (Year: 2013).*

(Continued)

*Primary Examiner* — Jennifer N To
*Assistant Examiner* — Eric J Yoon
(74) *Attorney, Agent, or Firm* — SBMC

(57) ABSTRACT

An expandable drawing surface is described. In various embodiments, a drawing surface manager is configured to cause a size of a drawing surface to expand dynamically to provide a user with a truly infinite drawing surface such that the user is not limited for space in any direction. To do so, the drawing surface manager creates and displays new pages for the drawing surface as the user scrolls in any direction. The new pages are displayed proximate existing pages such that the user is presented with a continuous drawing surface on which the user can work seamlessly. In one or more embodiments, a memory manager is configured to provide efficient memory techniques such that, at any point of time, only data associated with visible pages of the drawing surface is loaded onto a memory.

20 Claims, 12 Drawing Sheets

(56) References Cited

U.S. PATENT DOCUMENTS

| | | | | |
|---|---|---|---|---|
| 2008/0282196 A1* | 11/2008 | Park | ............... | H04M 1/72544 |
| | | | | 715/838 |
| 2010/0094878 A1* | 4/2010 | Soroca | ............... | G06Q 30/02 |
| | | | | 707/748 |
| 2013/0061163 A1* | 3/2013 | Clark | ............... | G06F 19/708 |
| | | | | 715/771 |
| 2013/0067186 A1* | 3/2013 | Pronovost | ............... | G06F 12/02 |
| | | | | 711/170 |
| 2013/0111395 A1* | 5/2013 | Ying | ............... | G06F 3/0483 |
| | | | | 715/783 |
| 2014/0149636 A1* | 5/2014 | Morrison, III | ............... | G06F 3/0608 |
| | | | | 711/102 |
| 2014/0164984 A1* | 6/2014 | Farouki | ............... | G06F 3/0481 |
| | | | | 715/784 |

OTHER PUBLICATIONS

B. Wood, Adobe Illustrator CC Classroom in a Book, published Oct. 2014, selected excerpts (Year: 2014).*

C. Sorrel, Cult of Mac website, "Sketchology App with Infinite Zoom, Limitless Canvas," published Nov. 6, 2013, selected excerpts, downloaded at https://www.cultofmac.com/253111/sketchology-app-with-infinite-zoom-limitless-canvas/ (Year: 2013).*

YouTube video by user Phil Ebiner, "How to Create Multiple Artboards in Adobe Illustrator," published Mar. 5, 2015, downloaded from https://www.youtube.com/watch?v=inMj6HBYljM) (Year: 2015).*

* cited by examiner

EXPANDABLE DRAWING SURFACE

BACKGROUND

Conventional drawing applications allow the user to draw on a drawing surface of a finite size. Thus, users are often restricted by a limited amount of screen area to work with, especially when using mobile devices and tablet devices which have small display screens. Some conventional drawing applications for mobile devices may provide a drawing surface larger than the screen area defined by the display screen, but these drawing surfaces are still finite and limited on all sides.

SUMMARY

An expandable drawing surface is described. In various embodiments, a drawing surface manager is configured to cause a size of a drawing surface to expand dynamically to provide a user with a truly infinite drawing surface such that the user is not limited for space in any direction. To do so, the drawing surface manager creates and displays new pages for the drawing surface as the user scrolls in any direction. The new pages are displayed proximate existing pages such that the user is presented with a continuous drawing surface on which the user can work seamlessly.

In one or more embodiments, a memory manager is configured to provide efficient memory techniques such that, at any point of time, only data associated with visible pages of the drawing surface is loaded onto a memory. Thus, as the size of the drawing surface increases, the total amount of data loaded onto the memory at any point in time remains low, which drastically limits memory usage even if the drawing surface expands to hundreds or thousands of pages.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
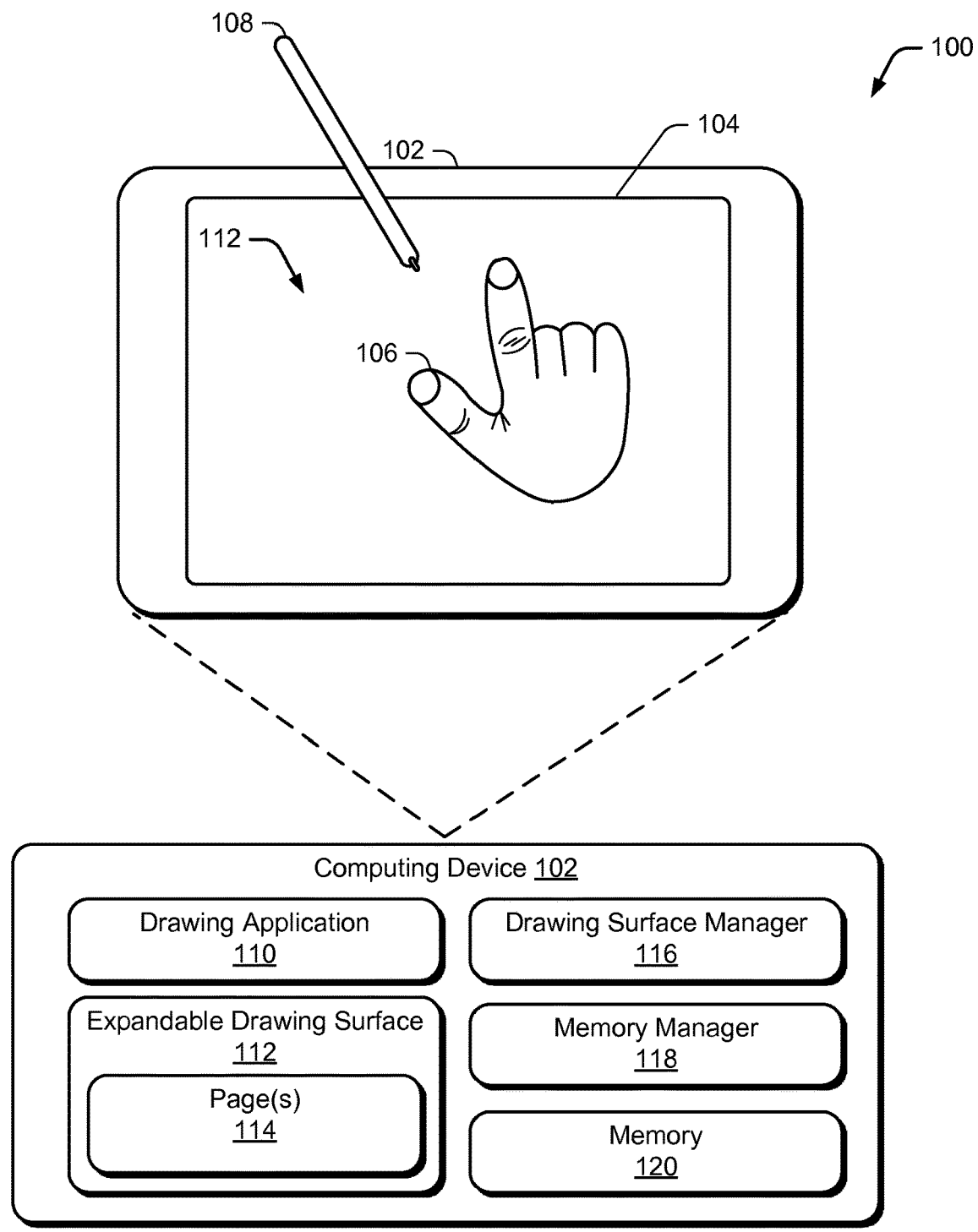
FIG. 1 illustrates an environment in an example implementation that is operable to employ techniques described herein.

Conventional drawing applications allow the user to draw on a drawing surface of a finite size. For example, the user may be able to expand the drawing surface to be larger than the screen area, but at a certain point the user will be unable to expand the drawing surface any further because there is a maximum size that the user can scroll in each direction. Thus, users are often restricted by the limited amount of screen area to work with, especially when using mobile devices and tablet devices which have small screens. This can be frustrating to a user that is halfway through a large drawing, and learns that the size of the drawing surface cannot be expanded any further. Conventional solutions simply do not provide a truly infinite drawing surface which can extend in any direction without restriction. In principle, an infinite drawing surface requires an infinite amount of memory. As such, providing an infinite drawing surface is not practical for conventional solutions.

Some spreadsheet applications, such as Microsoft Excel®, enable a user to scroll to create a spreadsheet with a large number of rows and columns. However, even spreadsheet applications such as Excel® limit the total number of rows and columns. For example, current versions of Excel limit the size of a spreadsheet to 1,048,576 rows by 16,384 columns. Further Microsoft Excel® notes that the size of a worksheet or workbook is limited by available memory and system resources. Thus, Excel may provide an error message that the memory and system resources have been exceeded when a spreadsheet grows to a high number of rows and columns because each additional data cell takes additional memory to manage. Further, the amount of memory needed to manage cells of text in a spreadsheet is generally less than the amount of memory needed to manage drawing data.

An expandable drawing surface is described. Unlike conventional solutions in which the size of the drawing surface is finite, a size of the drawing surface is configured to increase dynamically, in any direction (e.g., up, down, left, right, and diagonally), to provide a user with a truly infinite drawing surface on which the user can work seamlessly. This feature is a huge benefit for many users in the creative industry enabling them to express themselves without restriction.

In one or more embodiments, a drawing surface manager is configured to display, on the display screen, a drawing surface for a drawing application. Initially, the drawing surface may comprise a single initial page. In response to user input to expand the drawing surface, the drawing surface manager expands the drawing surface by creating one or more new pages for the drawing surface, such that the newly created pages each correspond to a same size as the initial page. The drawing surface manager then scrolls the drawing surface in accordance with the user input such that an area of the display screen is no longer occupied by the initial page, and displays at least a portion of the one or more new pages in the area of the display screen that is no longer occupied by the initial page such that the initial page and the newly created pages cover the entire area of the display screen making the drawing surface continuous. If the user scrolls anywhere within the boundaries of the drawing surface, then the already existing pages are shown to the user. Furthermore, the user can keep on scrolling and extend the boundaries thereby making the drawing surface infinite in any direction. Thus, the user is not limited for space in any directions and is able to express freely on the expandable drawing surface.

In one or more embodiments, a memory manager is configured to efficiently provide memory managements techniques, such that at any point of time, only the visible pages of the drawing surface are loaded onto the memory. As the user interacts with the drawing surface, the memory manager loads, onto the memory, data associated with pages of the drawing surface that are currently visible on the display screen, and removes, from the memory, data associated with pages of the drawing surface that are not currently visible on the display screen. Furthermore, when a stroke is drawn, only a portion of the underlying bitmap of the drawing through which the newly created stroke passes is enabled for manipulation. In this way, the memory manager ensures that as the size of the drawing surface increases, the total amount of data loaded onto the memory at any point of time remains low, which drastically limits memory usage even if the drawing surface expands to hundreds or thousands of pages.

Example Environment

FIG. 1 illustrates an environment 100 in an example implementation that is operable to employ techniques described herein. Environment 100 includes a computing device 102. In FIG. 1, computing device 102 is illustrated as a tablet computing device. It is to be appreciated, however, that computing device 102 may be configured in a variety of different ways. For instance, computing device 102 may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 9.

Computing device 102 further includes a display screen 104 that is configured to render images for viewing. In one or more implementations, display screen 104 may be implemented as a touch screen display that is configured to receive touch input via one or more fingers of a user's hand 106 or a stylus 108. Display screen 104 may receive input via other input devices which are not pictured in FIG. 1, such as a mouse input device, a keyboard input device, a touch pad, and the like.

Computing device 102 includes a drawing application 110 that enables a user to draw on an expandable drawing surface 112 ("drawing surface") rendered by display screen 104. To do so, the user can provide touch input via one or more fingers of the user's hand 106, via stylus 108, or via any other type of input device. Initially, upon activation of drawing application 110 or upon creation of a new drawing surface 112, the drawing surface 112 includes a single page 114. Generally, each page 114 of drawing surface 112 corresponds to the size of display screen 104. However, page 114 may also correspond to a size of a window or drawing area of drawing application 110 that is open on display screen 104. In one or more embodiments, each page 114 comprises a canvas element, which is the most fundamental view on which a user can draw. Drawing application 110 may be implemented as any type of drawing application, such as Adobe® Photoshop, Adobe® Illustrator, or Adobe® Ideas, to name just a few.

Computing device 102 also includes a drawing surface manager 116 and a memory manager 118. Drawing surface manager 116 is configured to cause a size of drawing surface 112 to expand dynamically to provide the user with a truly infinite drawing surface such that the user is not limited for space in any direction. To do so, drawing surface manager 116 creates and displays new pages 114 for drawing surface 112 as the user scrolls in any direction. The new pages 114 are displayed proximate existing pages such that the user is presented with a continuous drawing surface on which the user can work seamlessly.

Computing device 102 further includes a memory manager 118 that is configured to provide efficient memory techniques such that, at any point of time, only data associated with visible pages 114 of drawing surface 112 are loaded onto a memory 120. Thus, as the size of the drawing surface increases, the total amount of data loaded onto the memory at any point of times remains low, which drastically limits memory usage even if the drawing surface expands to hundreds or thousands of pages.

Figure 9:
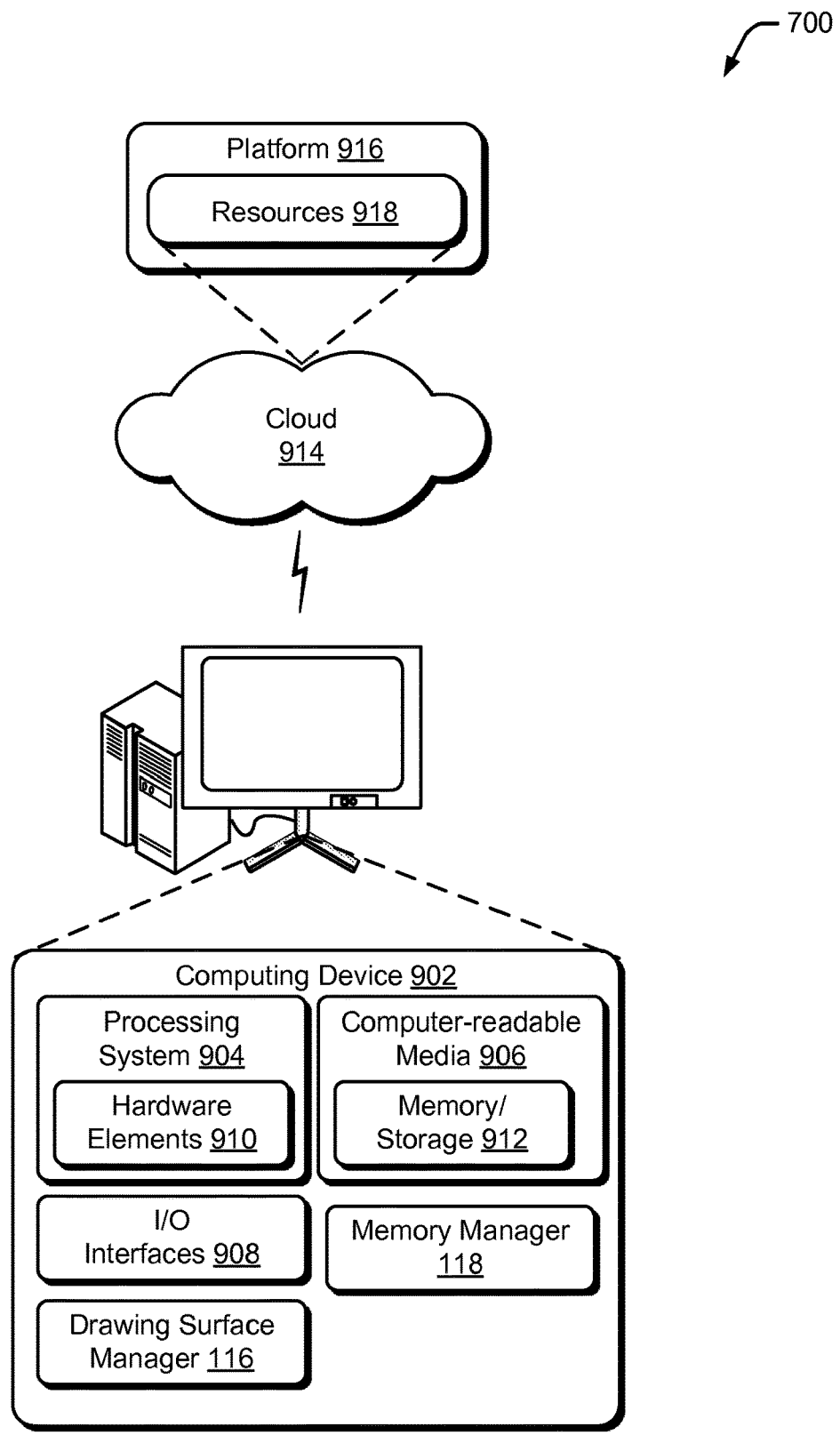
FIG. 9 illustrates an example system that includes an example computing device that is representative of one or more computing systems and/or devices that may implement the various techniques described herein.

Although illustrated as part of computing device 102, functionality of drawing surface manager 116 and memory manager 118 may also be implemented in a distributed environment, remotely via a network (e.g., "over the cloud") as further described in relation to FIG. 9, and so on.

In one or more embodiments, drawing surface manager 116 is configured to expand drawing surface 112 by creating pages in the x and y axis. Each page 114 may include an x,y origin coordinate that defines the position of the page in drawing surface 112 relative to an initial page.

Figure 2:
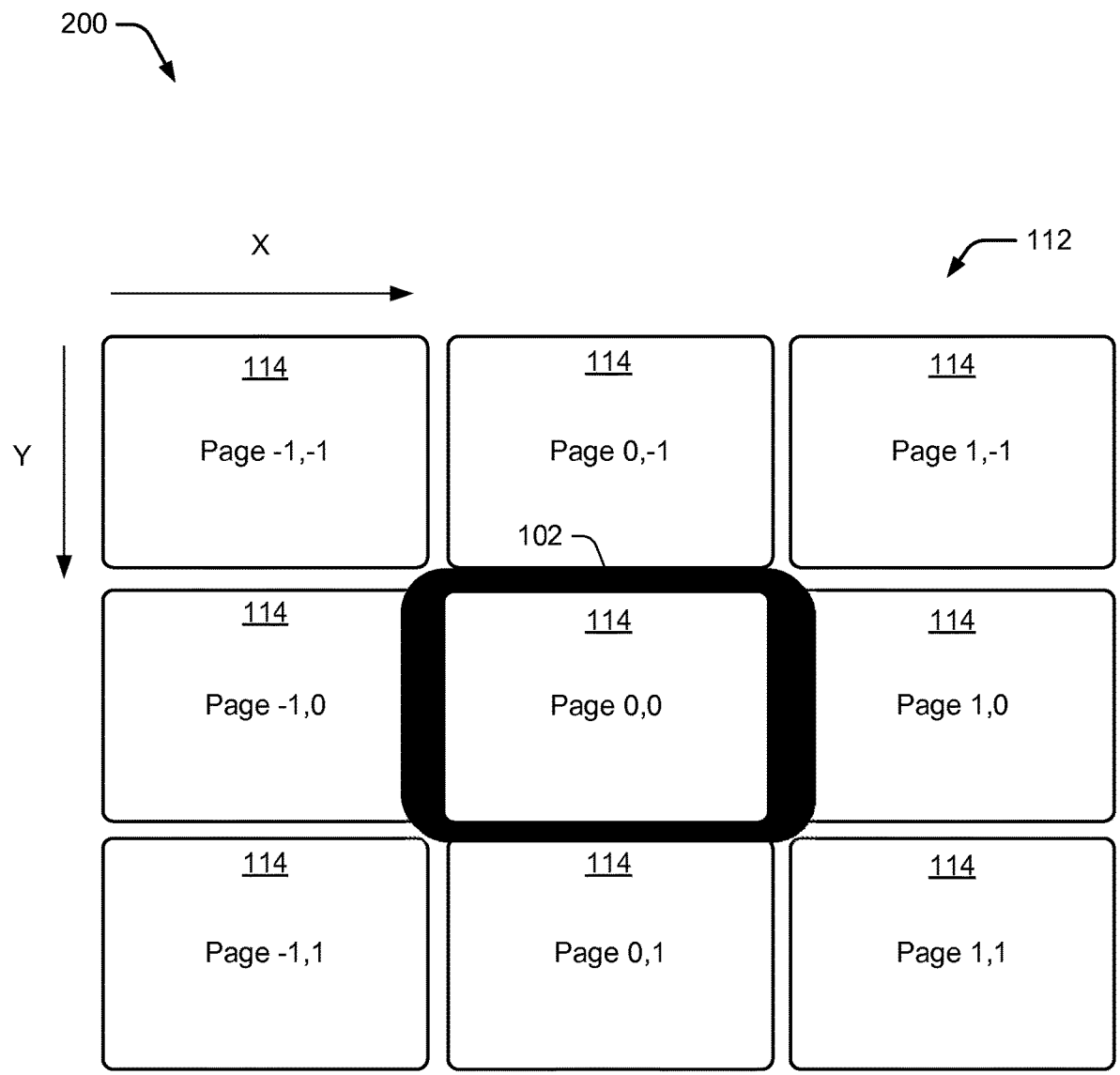
FIG. 2 illustrates an example layout of pages of a drawing surface.

Consider, for example, FIG. 2, which illustrates an example layout 200 of pages 114 of drawing surface 112.

In this example, drawing surface 112 includes multiple different pages 114, each of which are of a fixed size which generally corresponds to the size of display screen 104 of computing device 102. In other words, the height and width of each page 114 corresponds to the height and width of display screen 104. Alternately, the size of each page 114 may correspond to a window or drawing area of drawing application 110 that is displayed within display screen 104.

Each page 114 has an origin coordinate defined by an x,y axis, and the pages are spaced linearly in a 2D-plane making up the whole drawing surface 112. For example, an initial page, which is illustrated as being displayed on display screen 104, includes an x,y origin coordinate of 0,0. The page to the right of page 0,0 includes an x,y origin coordinate of 1,0, whereas the page to the left of page 0,0 includes an x,y origin coordinate of −1,0. Similarly, the page above initial page 0,0 includes an x,y origin coordinate of 0,−1 whereas the page below page 0,0 includes an x,y origin coordinate of 0,1. Together, all of the pages 114 form the complete drawing surface 112. Of course, the x-y coordinate system illustrated in FIG. 2 is just one example of a coordinate system that can be used to describe the relationship between pages 114 of drawing surface 112.

Drawing surface 112 is defined by boundaries comprising a top boundary, a bottom boundary, a left boundary, and a right boundary. The user can expand the drawing surface by providing user input, e.g., by swiping, to scroll past one of the boundaries of the drawing surface. For example, when drawing application 110 is activated and a new drawing surface 112 is created, the new drawing surface 112 may include a single initial page 114. However, in response to user input to scroll drawing surface 112, drawing surface manager 116 expands drawing surface 112 by creating one or more new pages 114 for drawing surface 112. At least partially concurrently, drawing surface manager 116 scrolls drawing surface 112 in accordance with the user input such that an area of the display screen 104 is no longer occupied by the initial page 114, and causes display of at least a portion of the one or more new pages 114 in the area of the display screen 104 that is no longer occupied by the initial page.

The newly created pages 114 are of the same size as the initial page and are placed proximate the initial page such that the pages covers the entire area of display screen 104 thereby making drawing surface 112 continuous. Drawing surface manager 116 is configured to enable navigation within existing pages 114 of drawing surface 112 without expanding the drawing surface. For example, if the user scrolls anywhere within the boundaries of drawing surface 112, drawing surface manager 116 shows the already existing pages to the user. However, the user can keep on scrolling and extend the boundaries thereby making the drawing surface infinite in any direction.

Figure 3A:
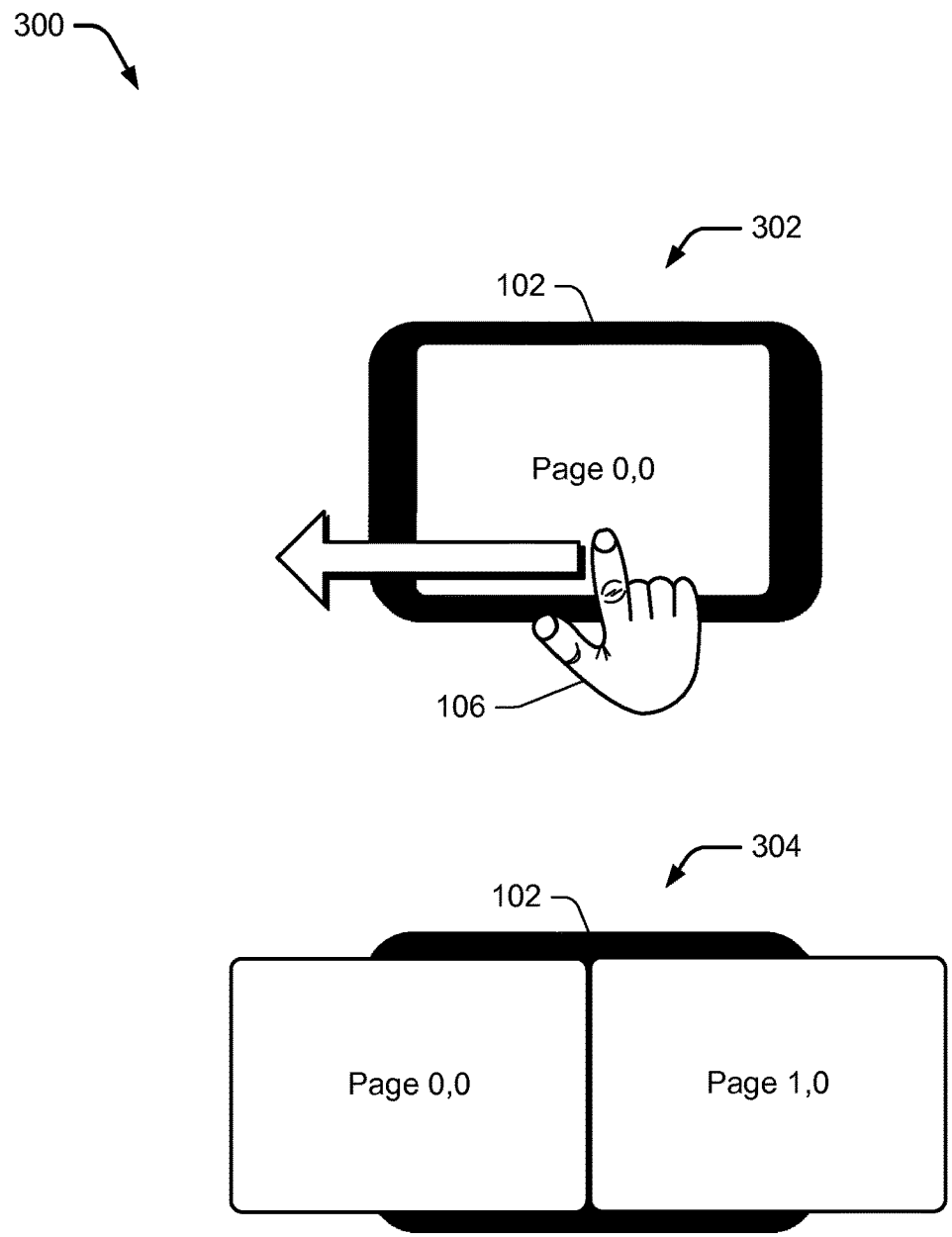
FIG. 3A illustrates an example of expanding a drawing surface in response to user input to expand the drawing surface by swiping left on the drawing surface.
Figure 3B:
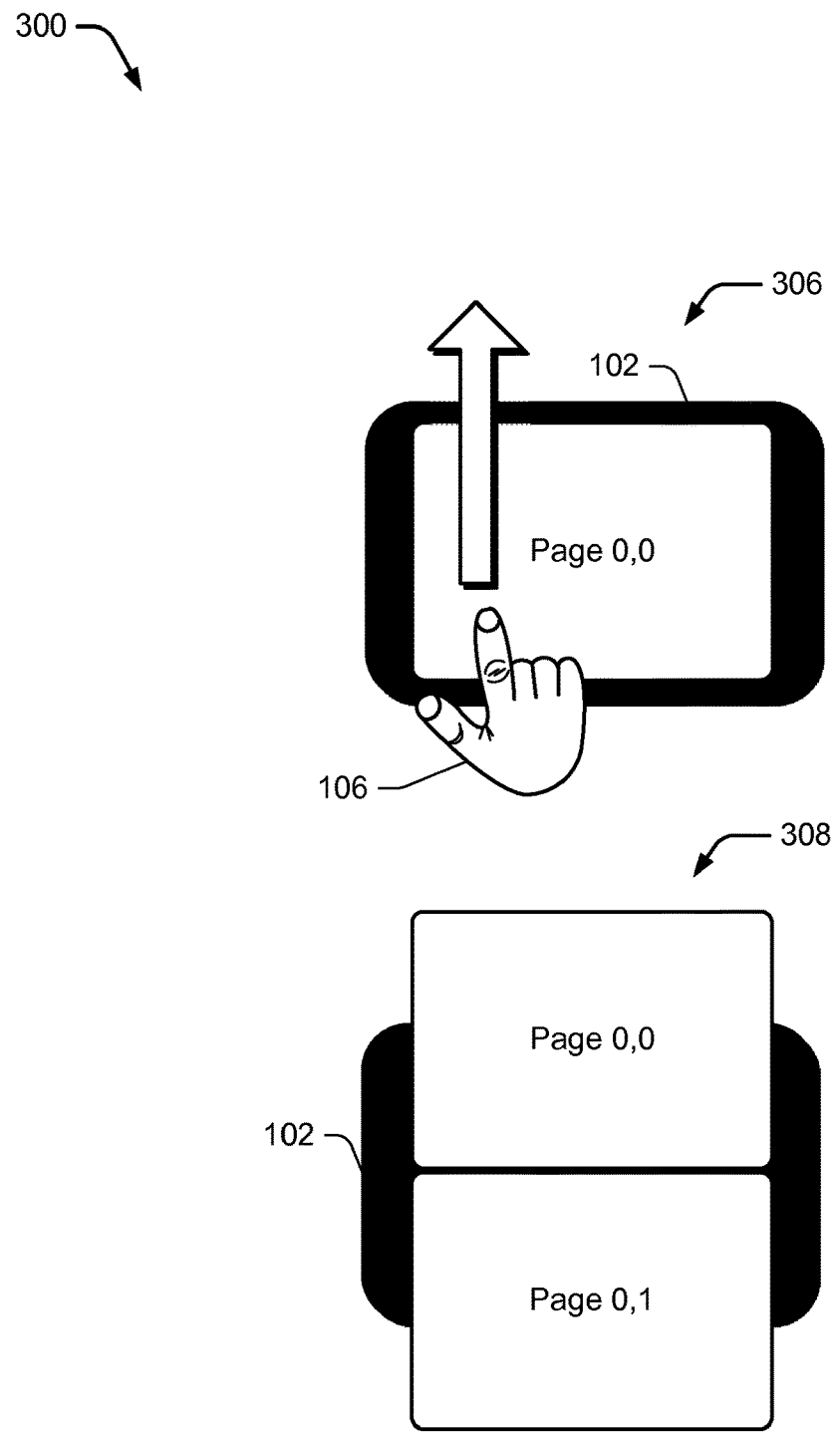
FIG. 3B illustrates an additional example of expanding the drawing surface in response to user input to expand the drawing surface by swiping up on the drawing surface.
Figure 3C:
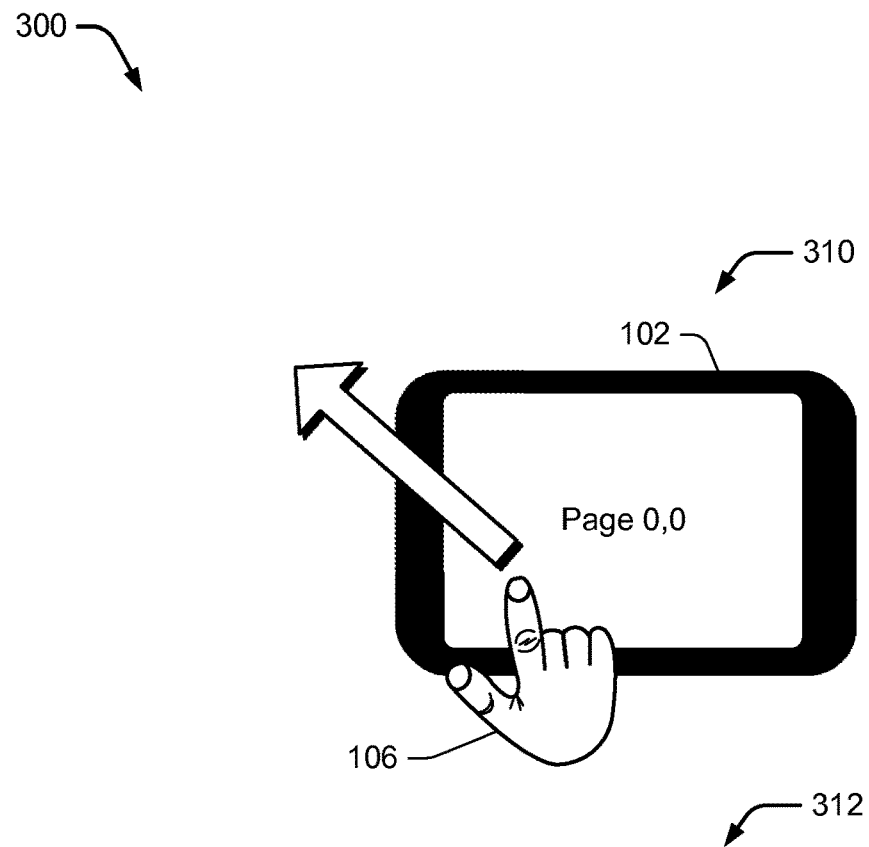
FIG. 3C illustrates an additional example of expanding the drawing surface in response to user input to expand the drawing surface by swiping diagonally on the drawing surface.
Figure 3C:
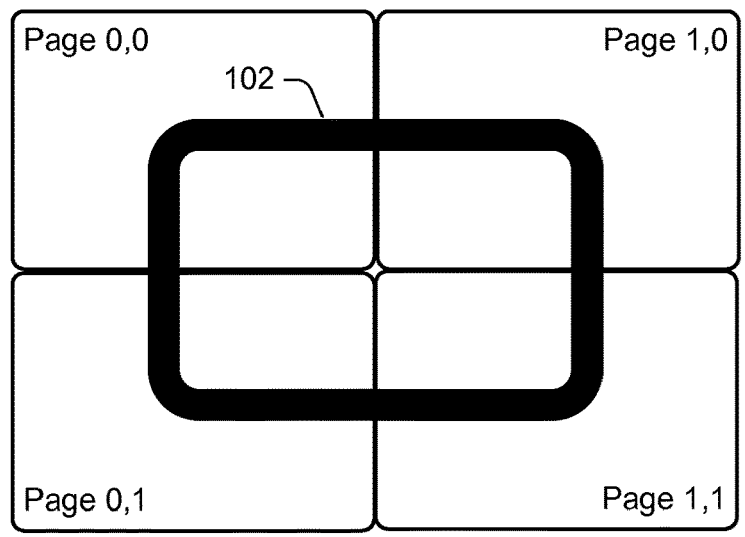

As an example, consider FIGS. 3A, 3B, and 3C which illustrate examples 300 of expanding the drawing surface.

FIG. 3A illustrates an example 300 of expanding drawing surface 112 in response to user input to expand the drawing surface by swiping left on the drawing surface. At 302, in response to activation of drawing application 110, drawing surface manager 116 creates and displays a new drawing surface 112 which includes a single initial page 114 (page 0,0). At 304, in response to the user providing user input to expand drawing surface 112 by swiping left on drawing surface 112, drawing surface manager 116 expands drawing surface 112 by creating a new page 1,0 for drawing surface 112. At least partially concurrently, drawing surface manager 116 scrolls drawing surface 112 to the left in accordance with the user input such that an area on the right side of display screen 104 is no longer occupied by the initial page 0,0, and causes display of at least a portion of the new page 1,0 in the area of display screen 104 that is no longer occupied by the initial page 0,0. Notably, new page 1,0 is the same size as initial page 0,0, and is placed proximate the initial page 0,0 such that the initial page and the new page 1,0 covers the entire area of display screen 104 thereby making drawing surface 112 continuous.

FIG. 3B illustrates an additional example 300 of expanding drawing surface 112 in response to user input to expand the drawing surface by swiping up on the drawing surface. At 306, in response to activation of drawing application 110, drawing surface manager 116 creates and displays a new drawing surface 112 which includes a single initial page 114 (page 0,0). At 308, in response to the user providing user input to expand drawing surface 112 by swiping up on drawing surface 112, drawing surface manager 116 expands drawing surface 112 by creating a new page 0,1 for drawing surface 112. At least partially concurrently, drawing surface manager 116 scrolls drawing surface 112 upwards in accordance with the user input such that an area on the bottom of display screen 104 is no longer occupied by the initial page 0,0, and causes display of at least a portion of the new page 0,1 in the area of display screen 104 that is no longer occupied by the initial page 0,0. Notably, new page 0,1 is the same size as initial page 0,0, and is placed proximate initial page 0,0 such that the initial page 0,0 and the new page 0,1 cover the entire area of display screen 104, thereby making drawing surface 112 continuous.

FIG. 3C illustrates an additional example 300 of expanding drawing surface 112 in response to user input to expand the drawing surface by swiping diagonally on the drawing surface. At 310, in response to activation of drawing application 110, drawing surface manager 116 creates and displays a new drawing surface 112 which includes a single initial page 114 (page 0,0). At 312, in response to the user providing user input to expand drawing surface 112 by swiping diagonally (up and to the left) on drawing surface 112, drawing surface manager 116 expands drawing surface 112 by creating three new pages (page 1,0, page 0,1, and page 1,1) for drawing surface 112. At least partially concurrently, drawing surface manager 116 scrolls drawing surface 112 up and to the left in accordance with the user input such that upper right, lower right, and bottom left portions of display screen 104 are no longer occupied by the initial page 0,0, and causes display of at least a portion of the new pages in the area of display screen 104 that is no longer occupied by the initial page 0,0. In this case, new page 1,0 occupies the upper right portion of display screen 104, new page 1,1 occupies the bottom right portion of display screen 104, and new page 0,1 occupies the bottom left portion of display screen 104. The new pages are placed proximate the initial page 0,0 such that the initial page 0,0 and the new pages 1,0, 01, and 1,1 cover the entire area of display screen 104 thereby making drawing surface 112 continuous. Notably, unlike a swipe in a single direction, a diagonal swipe causes three new pages to be created and displayed in order to keep the drawing surface continuous.

Drawing surface manager 116 may be configured to recognize various different types of user input to expand drawing surface 112. For example, as shown above, in some cases the user can simply swipe up, down, left, right, or diagonally to expand drawing surface 112. Alternately, a specific type of gesture may be used. For example, a two finger swipe may cause drawing surface 112 to expand, whereas a single finger swipe may cause drawing input (e.g., associated with a virtual pen or pencil) to be received. Alternately, drawing application 110 may present various controls that are selectable, such as a scroll control, a select control, a draw control, an erase control, and so forth. In this instance, when the scroll control is selected, the user can scroll between pages. Alternately, in some cases, drawing surface 112 may be configured to expand as the user is drawing. For example, if the user is drawing a stroke and the stroke approaches the boundary on the left, the drawing surface may expand as shown above.

As discussed above, it is difficult for conventional solutions to provide an infinitely expandable drawing surface due in part to the large amount of memory needed to store the data of the drawing surface. For example, a drawing surface that was expanded to thousands of pages would require a substantial amount of memory resources, and thus may slow down computing device 102.

In accordance with various embodiments, memory manager 118 is configured to efficiently manage the storage of drawing data in memory 120 such that, at any point in time, only data associated with visible pages of the drawing surface is loaded onto the memory. To do so, memory manager 118 is configured to load, onto memory 120, data associated with pages 114 that are currently visible in drawing surface 112, and also to remove, from memory 120, data associated with pages 114 which are not currently visible.

Figure 4A:
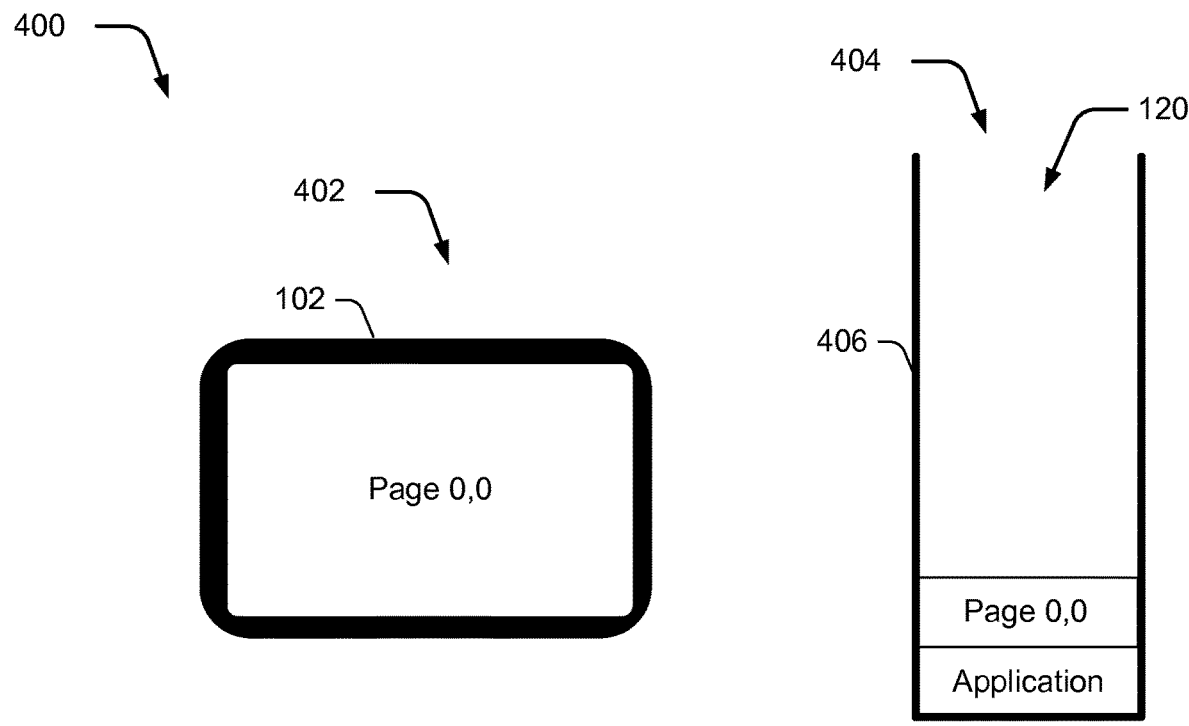
FIG. 4A illustrates an example of memory management techniques for a drawing surface.

As an example, consider FIG. 4A which illustrates an example 400 of memory management techniques for drawing surface 112. At 402, the user activates drawing application 110. In response, at 404, memory manager 118 loads drawing application 110 onto memory 120 by placing drawing application 110 on the bottom of a memory stack 406. Drawing application 110 may remain in this position in memory stack 406 for as long as drawing application 110 is active. Activation of drawing application 110 causes drawing surface manager 116 to create a new drawing surface 112, which includes an initial page 114 (page 0,0). As page 0,0 is the only visible page, memory manager 118 loads data associated with page 0,0 onto memory stack 406 on top of drawing application 110.

Figure 4B:
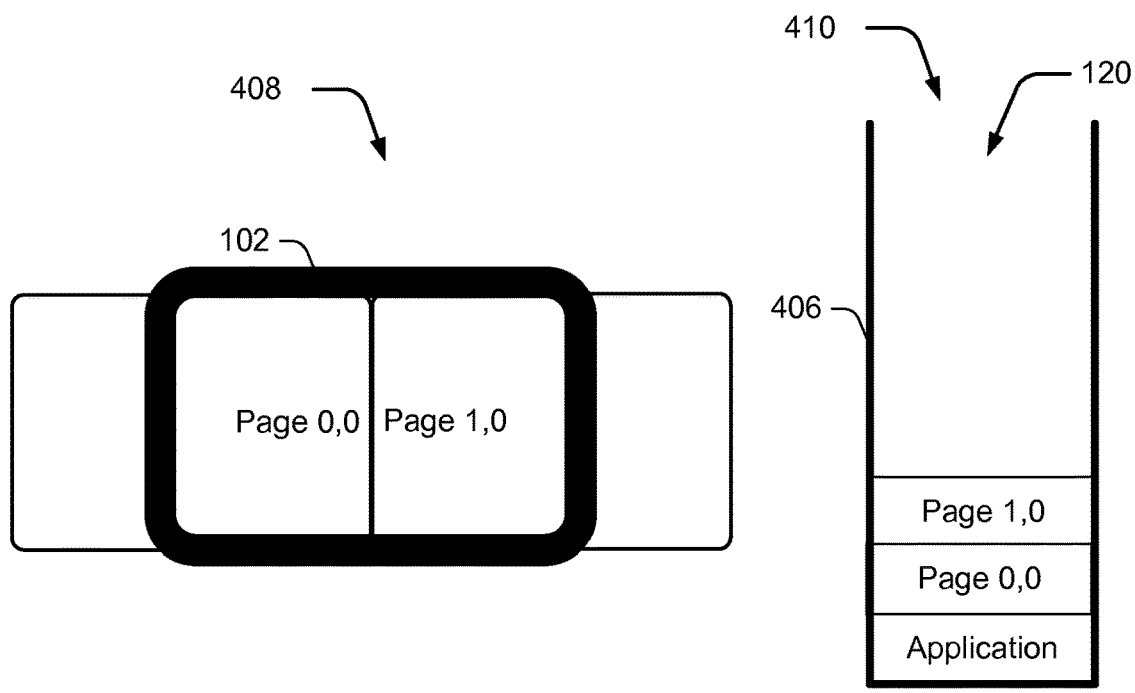
FIG. 4B illustrates an additional example of memory management techniques for the drawing surface.

Continuing with this example, consider FIG. 4B which illustrates an additional example 400 of memory management techniques for drawing surface 112. At 408, the user swipes to the left, and in response drawing surface manager 116 causes new page 1,0 to be created and displayed on display screen 104. At 410, since new page 1,0 is now visible, memory manager 118 loads data associated with page 1,0 onto memory stack 406 of memory 120. Notably, since page 1,0 is still visible on display screen 104, memory stack 406 of memory 120 includes data associated with both visible pages 0,0 and 1,0.

Figure 4C:
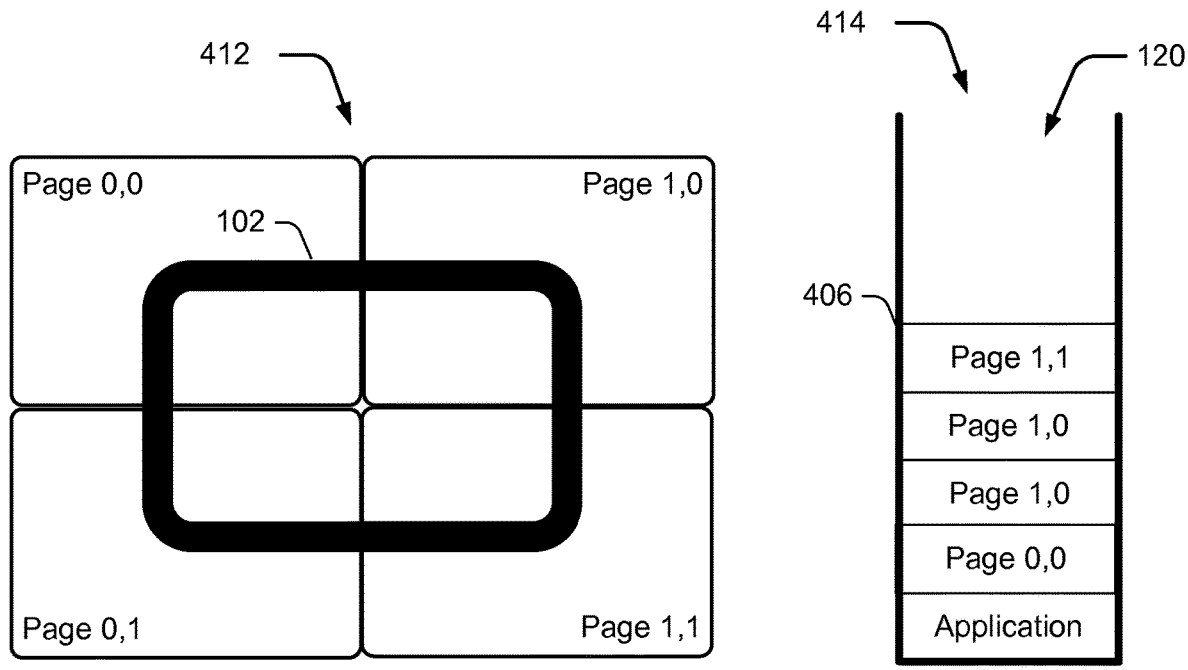
FIG. 4C illustrates an additional example of memory management techniques for the drawing surface.

Continuing with this example, consider FIG. 4C which illustrates an additional example 400 of memory management techniques for drawing surface 112. At 412, the user swipes upwards, and in response drawing surface manager 116 causes two new pages, pages 0,1 and 1,1 to be created and displayed on display screen 104. At 414, as new pages 0,1 and 1,1 are now visible, memory manager 118 loads data associated with both of pages 0,1 and 1,1 onto memory stack 406 of memory 120. Notably, since pages 0,0 and 1,0 are still visible on display screen 104, memory stack 406 includes data associated with four visible pages, 0,0, 1,0, 0,1, and 1,1.

Figure 4D:
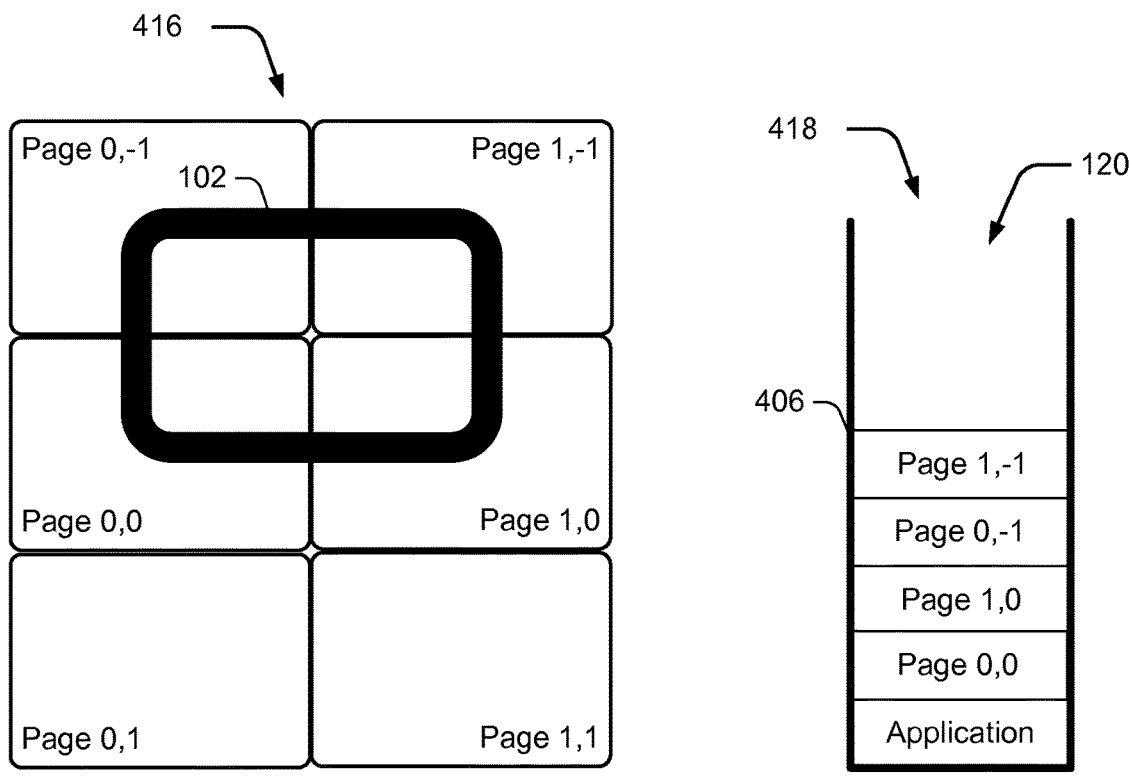
FIG. 4D illustrates an additional example of memory management techniques for the drawing surface.

Continuing with this example, consider FIG. 4D which illustrates an additional example 400 of memory management techniques for drawing surface 112. At 416, the user swipes downwards, and in response drawing surface manager 116 causes two new pages, pages 0,-1 and 1,-1 to be created and displayed on display screen 104. At 418, as new pages 0,-1 and 1,-1 are now visible, memory manager 118 loads data associated with both of pages 0,-1 and 1,-1 onto memory stack 406. Notably, since pages 0,0 and 1,0 are still visible on display screen 104, the memory stack includes data associated with four visible pages, 0,0, 1,0, 0,-1, and 1,-1. However, as pages 0,1 and 1,1 are no longer visible, memory manager 118 removes the data associated with pages 0,1 and 1,1 from memory stack 406 of memory 120.

Note that due to the size constraint that a page corresponds to a size of display screen 104 or a defined drawing area, memory manager 118 may load data associated with a maximum of four visible pages at any one time. Thus, even when a size of drawing surface 112 expands to hundreds or thousands of pages 114, the total amount of data loaded onto memory 120 will be associated with just four pages 114.

When storing data in memory 120, the data structure used by memory manager 118 honors the absolute position of the drawing within drawing surface 112. For example, when a user provides drawing input (e.g., by pen or finger touch input) to drawing surface 112, a corresponding stroke is created on drawing surface 112. As described herein, a stroke is a collection of points. The drawing data for each point of the stroke is stored as a combination of the origin coordinate of page 114 on which the point is located (e.g., the x,y coordinate of the page relative to the initial page 0,0), and the relative position of the point within page 114. Thus the data effectively captures the absolute position of the strokes within drawing surface 112.

Figure 5:
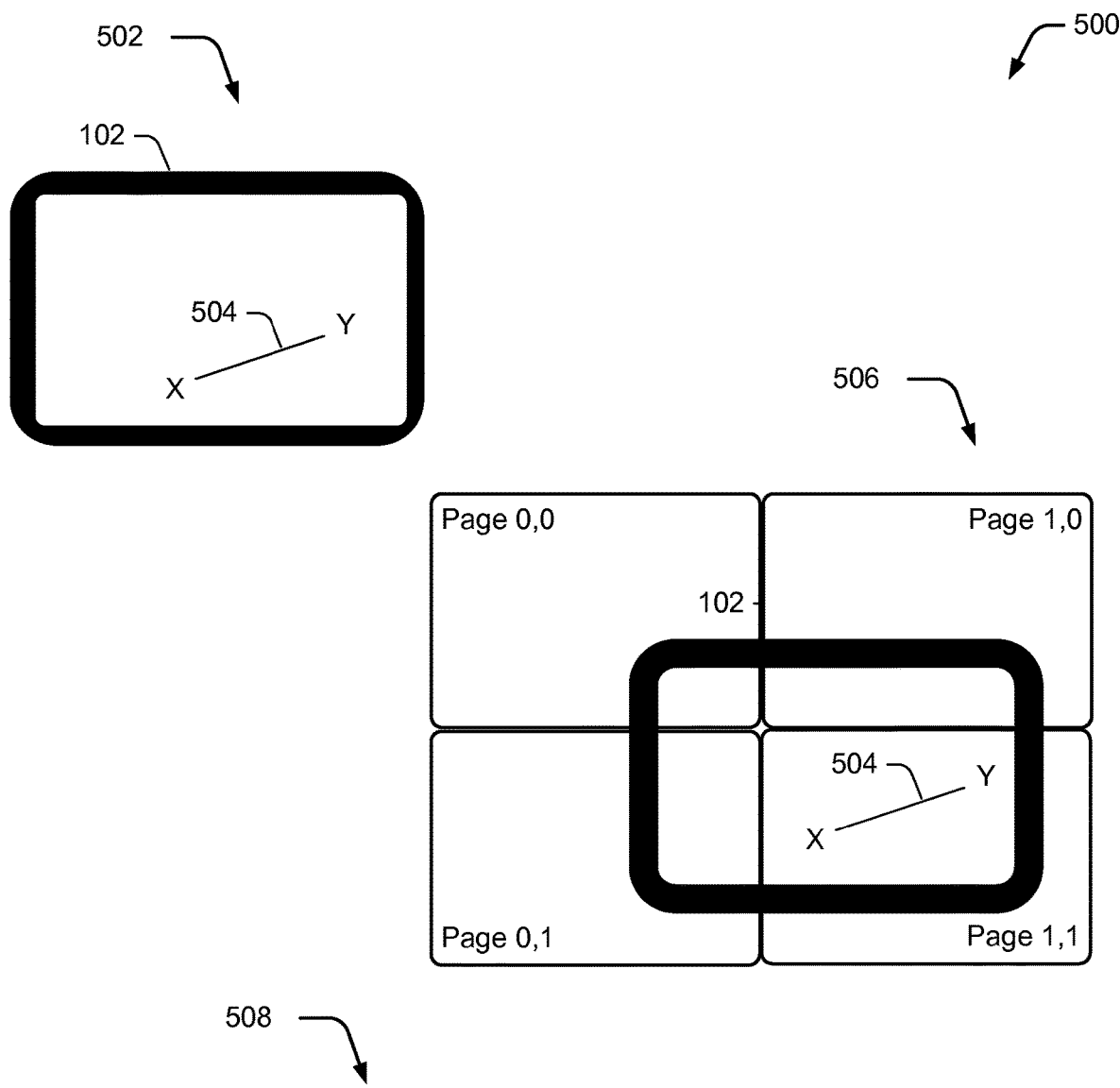
FIG. 5 illustrates an example of data storage management techniques for a drawing surface.

Consider, for example, FIG. 5 which illustrates an example 500 of data storage management techniques for drawing surface 112.

At 502, a user has drawn a drawing stroke 504 from a point X to a point Y on drawing surface 112. As illustrated at 502, the user sees drawings stroke 504 on drawing surface 112, but is unaware of the pages 114 of drawing surface 112 which are currently displayed on display screen 104.

As illustrated at 506, for example, the internal workings of drawing surface manager 116 shows that 4 different pages are currently displayed in drawing surface 112, which include pages (0,0), (1,0), (0,1), and (1,1). In this case, stroke 504 is drawn on page (1,1). Notably, stroke 504 could also be drawn across multiple different pages 114. For example, stroke 504 could begin on page 1,0, cross through page 1,1, and end at page 0,1.

At 508, memory manager 118 stores drawing data corresponding to stroke 504, which includes a combination of the page's origin coordinate with regards to drawing surface 112, and the relative position of the point within the page. For example, for point X of stroke 504, memory manager 118 stores the page coordinate (1,1) as well as a point coordinate (100,350) corresponding to the position of point X within page 1,1. Similarly, for point Y of stroke 504, memory manager 118 stores the page coordinate (1,1) as well as a point coordinate (600,100) corresponding to the position of point Y within page 1,1. In this example, memory manager 118 also stores an RGB value (#0000ff) corresponding to the color of the line of stroke 504 and a thickness (5 pixels) of the line of stroke 504.

In various embodiments, the drawing on the canvas of drawing surface 112 is represented in the form of a bitmap, which in turn is displayed on display screen 104. When a user draws a stroke on the canvas of drawing surface 112, the bitmap is manipulated to contain the new stroke. Notably, the bitmap occupies a large portion of memory.

Thus, in one or more embodiments, instead of having only one bitmap that is the size of the entire canvas of drawing surface 112, the drawing surface is divided into grid-views on both the x-axis and y-axis. The grid view contains only a portion of the bitmap. Thus, memory manager 118 can load, onto memory 120, the portion of the bitmap corresponding to the pages 114 of drawing surface 112 that are currently visible on display screen 104. Loading the portion of the bitmap enables manipulation of the drawing on the portion of the bitmap corresponding to the pages 114 of drawing surface 112 that are currently visible.

Notably, loading just a portion of the bitmap decreases the amount of memory that is loaded in order to enable manipulation of the portion of the bitmap. When the manipulation is finished, drawing surface manager 116 converts the bitmap into a compressed image. When a stroke is drawn, only the grid-views are loaded through which the newly created stroke passes. Thus the bitmaps on which the user can draw are dynamically loaded into the memory 120. All the regions which do not have any drawing do not contain any bitmap data and hence have a negligible memory footprint.

Figure 6:
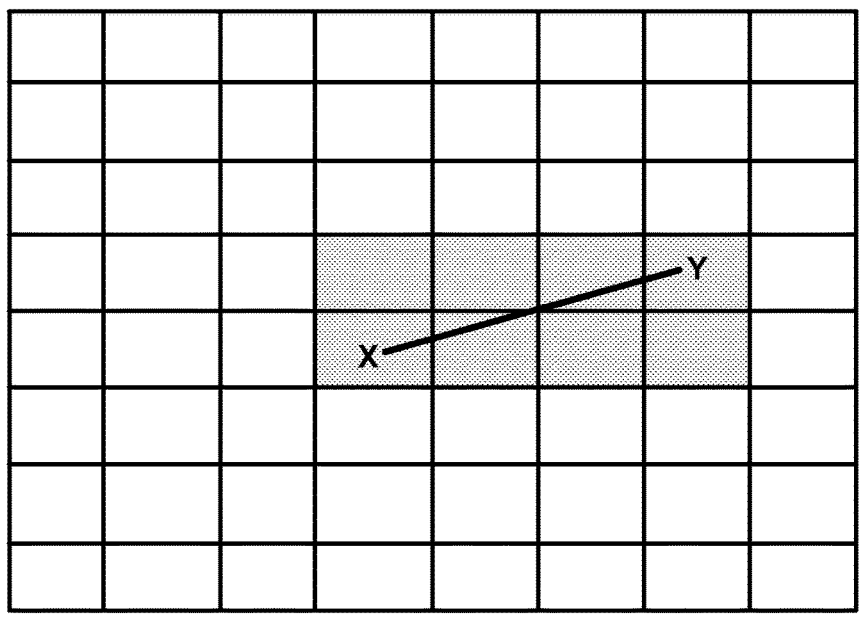
FIG. 6 illustrates an example of loading relevant bitmaps.

Consider, for example, FIG. 6, which illustrates an example 600 of loading relevant bitmaps. In this example, drawing surface 112 is divided into 64 smaller grid views. Of course, any number of grid views may be used. For a drawing stroke X-Y, memory manager 118 loads 8 out of the 64 grid views onto memory 120 to enable bitmap manipulation. The grid views of drawing surface 112 can span across multiple pages 114 and thus the user can draw across pages 114 seamlessly as if it was one giant canvas.

Example Procedures

The following discussion describes techniques for an expandable drawing surface. Aspects of these procedures may be implemented in hardware, firmware, or software, or a combination thereof. The procedures are shown as a set of blocks that specify operations performed by one or more devices and is not necessarily limited to the order shown for performing the operations by the respective blocks. In portions of the following discussion, reference will be made to previously referenced figures.

Figure 7:
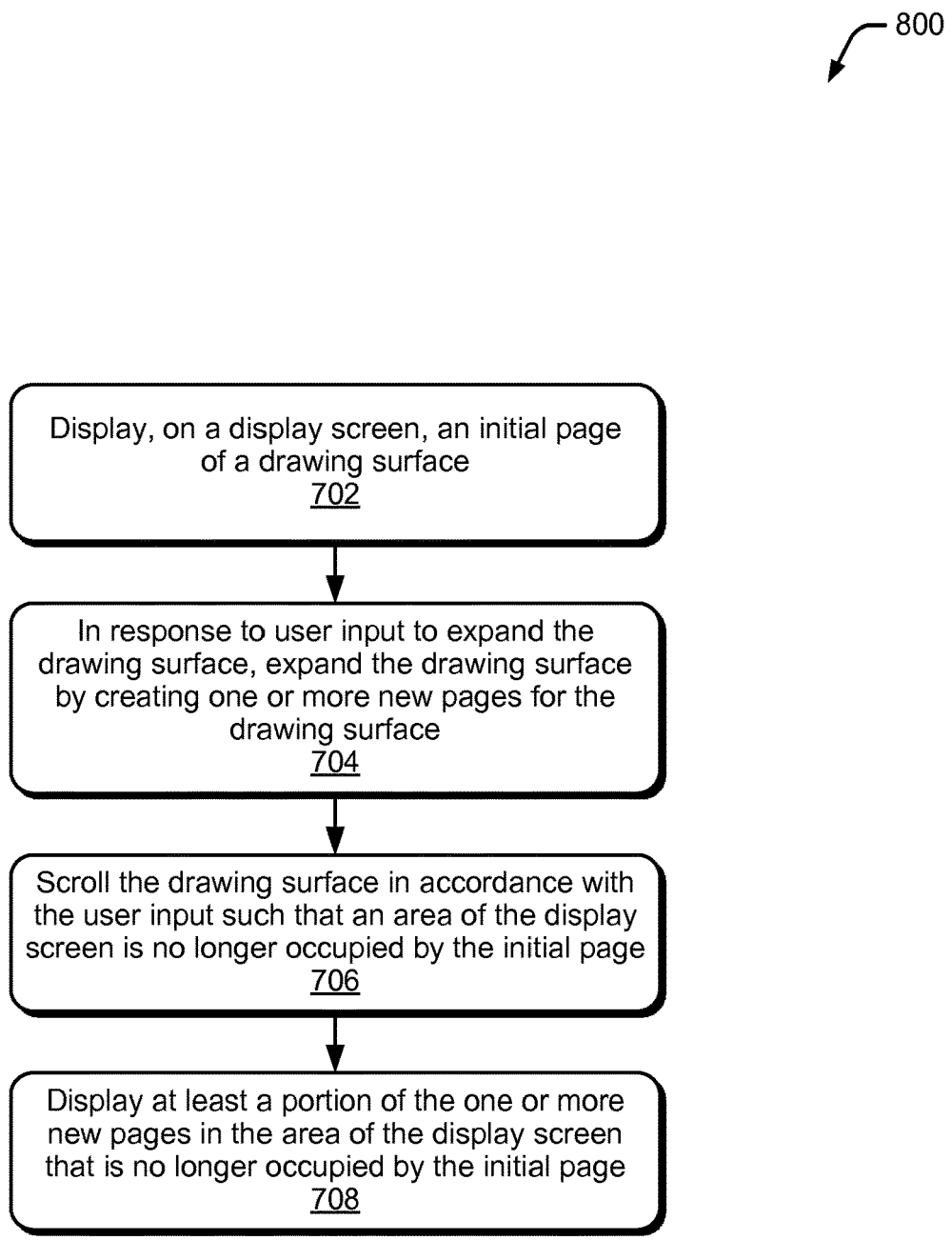
FIG. 7 illustrates a procedure in an example implementation of creating new pages for a drawing surface.

FIG. 7 illustrates a procedure 700 in an example implementation of creating new pages for a drawing surface.

At 702, an initial page of a drawing surface is displayed on a display screen. For example, drawing surface manager 116 causes display of an initial page 114 of drawing surface 112 on display screen 104.

At 704, in response to user input to scroll the drawing surface past a boundary, the drawing surface is expanded by creating one or more new pages for the drawing surface. For example, in response to user input to scroll drawing surface 112 past a boundary, drawing surface manager 116 expands drawing surface 112 by creating one or more new pages 114 for drawing surface 112. The one or more new pages may each comprise a same size as the initial page.

At 706, the drawing surface is scrolled in accordance with the user input such that an area of the display screen is no longer occupied by the initial page. For example, drawing surface manager 116 scrolls drawing surface 112 in accordance with the user input such that an area of display screen 104 is no longer occupied by initial page 114.

At 708, at least a portion of the one or more new pages are displayed in the area of the display screen that is no longer occupied by the initial page. For example, drawing surface manager 116 causes display of one or more new pages 114 in the area of display screen 104 that is no longer occupied by initial page 114.

Figure 8:
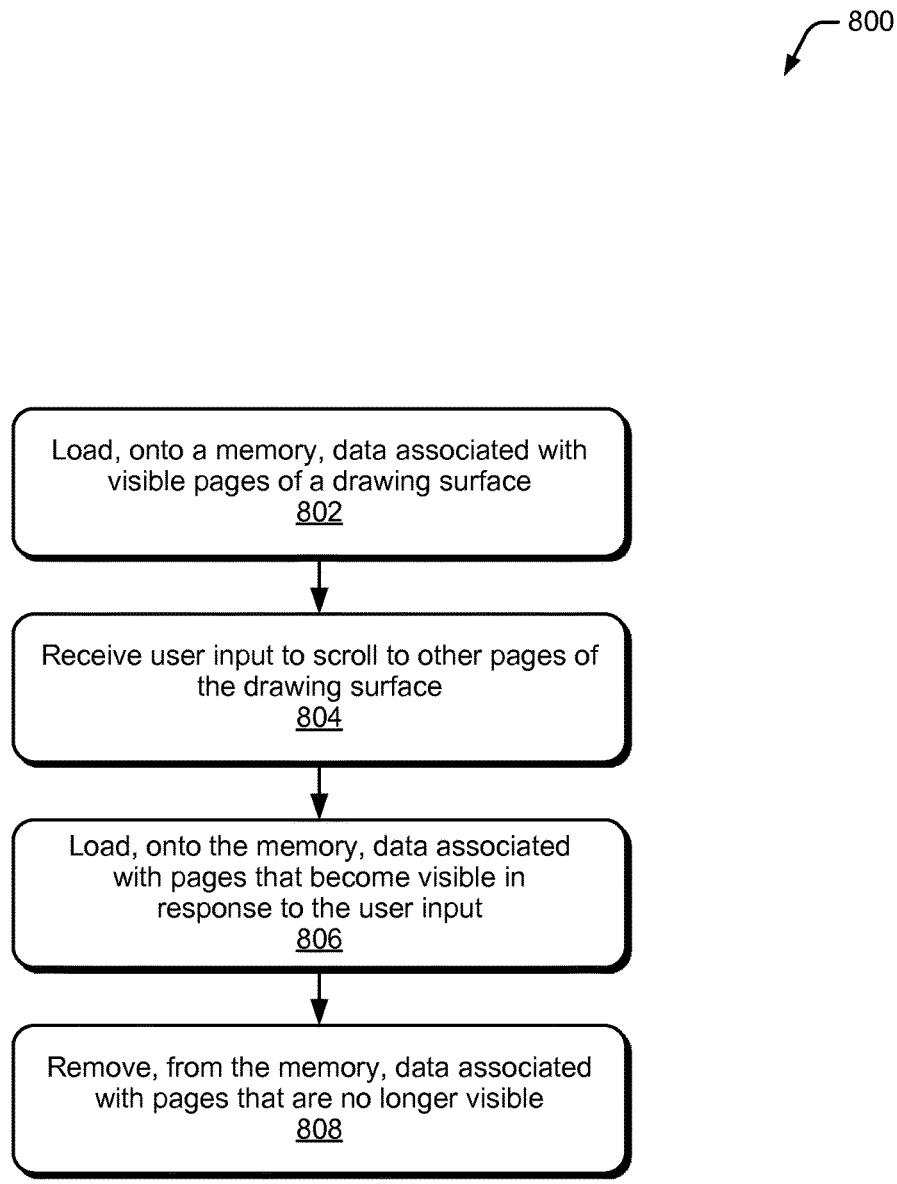
FIG. 8 illustrates a procedure in an example implementation of memory management techniques for a drawing surface.

FIG. 8 illustrates a procedure 800 in an example implementation of memory management techniques for a drawing surface.

At 802, data associated with visible pages of a drawing surface are loaded onto a memory. For example, memory manager 118 loads data associated with visible pages 114 of drawing surface 112 onto a memory 120.

At 804, user input to scroll to other pages of the drawing surface is received. For example, memory manager 118 receives user input to scroll to other pages 114 of drawing surface 112.

At 806, data associated with pages that become visible in response to the user input is loaded onto the memory. For example, memory manager loads data associated with pages 114 that become visible in response to the user input onto memory 120.

If the scroll action also causes previously visible pages to no longer be visible, then at 808 data associated with pages that are no longer visible is removed from the memory. For example, memory manager 118 removes data associated with pages 114 that are no longer visible from memory 120.

Example System and Device

FIG. 9 illustrates an example system generally at 900 that includes an example computing device 902 that is representative of one or more computing systems and/or devices that may implement the various techniques described herein. This is illustrated through inclusion of drawing application 110, which operate as described above. The computing device 902 may be, for example, a server of a service provider, a device associated with a client (e.g., a client device), an on-chip system, and/or any other suitable computing device or computing system.

The example computing device 902 is illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device implementation, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
a memory;
a display screen; and one or more processors to implement a drawing surface manager and a memory manager for a drawing application;

the drawing surface manager configured to:
  display, on the display screen, a drawing surface for a drawing application, the drawing surface comprising an initial page;
  in response to user input to expand the drawing surface, expand the drawing surface by creating one or more new pages for the drawing surface; and
  cause concurrent display of portions of the one or more new pages and the initial page on the display screen, the portions of the one or more new pages displayed proximate the initial page to form a continuous drawing surface configured to receive drawing input; and the memory manager configured to:
  load, on the memory, data associated with visible pages of the drawing surface which are visibly displayed on the display screen in response to user input that causes visible pages to be visibly displayed on the display screen by the drawing surface manager; and
  remove, from the memory, data associated with non-visible pages of the drawing surface which are not visibly displayed on the display screen in response to user input that causes a visible page to be no longer visibly displayed on the display screen by the drawing surface manager, wherein the memory manager is limited to loading, on the memory, data for a maximum of four concurrently visible pages at any given time.

2. The system of claim 1, wherein the drawing surface manager is configured to expand the drawing surface by creating pages in the x and y axis, and wherein each page includes an x,y origin coordinate that defines the position of the page in the drawing surface relative to the initial page.

3. The system of claim 1, wherein the drawing surface manager is further configured to enable navigation within existing pages of the drawing surface without further expanding the drawing surface.

4. The system of claim 1, wherein each page of the drawing surface corresponds to a size of the display screen.

5. The system of claim 1, wherein each page of the drawing surface comprises a canvas element.

6. The system of claim 1, wherein the drawing surface is defined by boundaries comprising a top boundary, a bottom boundary, a left boundary, and a right boundary.

7. The system of claim 6, wherein the user input comprises input to scroll past one of the boundaries of the drawing surface.

8. The system of claim 1, wherein the memory manager is further configured to, for a point of a drawing on the drawing surface, store the origin coordinate of the page on which the point is located and the relative position of the point within the page.

9. The system of claim 1, wherein the drawing surface manager causes concurrent display of portions of the one or more new pages and the initial page by causing display of at least a portion of the one or more new pages on a first area of the display screen that is no longer occupied by the initial page and causing display of at least a portion of the initial page in an additional area of the display screen that is not occupied by the one or more new pages.

10. The system of claim 1, wherein the memory manager loads the data associated with the non-visible pages onto the memory when subsequent user input causes the non-visible pages of the drawing surface to be displayed on the display screen.

11. The system of claim 1, wherein the drawing surface is expandable in any direction without restriction.

12. A computer-implemented method comprising:
  loading data associated with multiple visible pages of a drawing surface onto a memory, portions of the multiple visible pages concurrently visibly displayed proximate to one another on a display screen of a computing device to form a continuous drawing surface configured to receive drawing input;
  receiving user input to scroll to other pages of the drawing surface;
  loading, onto the memory, data associated with the other pages that become visibly displayed on the display screen in response to the user input; and
  removing, from the memory, data associated with pages that are no longer visibly displayed on the display screen in response to the user input, wherein the memory is limited to loading data for a maximum of four concurrently visible pages at any given time.

13. The computer-implemented method of claim 12, wherein drawing data of the drawing surface is stored as a bitmap, and wherein the loading further comprises loading, onto the memory, a portion of the bitmap corresponding to the pages of the drawing surface that are currently visible on the display screen.

14. The computer-implemented method of claim 13, wherein loading the portion of the bitmap enables manipulation of the drawing data on the portion of the bitmap corresponding to the pages of the drawing surface that are currently visible.

15. The computer-implemented method of claim 12, wherein the drawing surface is expandable in any direction without restriction.

16. A computer-implemented method comprising:
  displaying, on a display screen, an initial page of a drawing surface;
  loading, onto a memory, data corresponding to the initial page that is visibly displayed on the display screen;
  in response to user input to expand the drawing surface:
    expanding the drawing surface by creating one or more new pages for the drawing surface;
    concurrently displaying portions of the one or more new pages and the initial page on the display screen, the portions of the one or more new pages displayed proximate the initial page to form a continuous drawing surface configured to receive drawing input;
    loading, onto the memory, additional data corresponding to the displayed one or more new pages along with the data corresponding to the initial page; and
  in response to additional user input causing the initial page to be no longer visibly displayed on the display screen, removing the data associated with the initial page from the memory, wherein the memory is limited to loading data for a maximum of four concurrently visible pages at any given time.

17. The computer-implemented method of claim 16, wherein the one or more new pages each comprise a same size as the initial page.

18. The computer-implemented method of claim 16, wherein each page of the drawing surface corresponds to a size of the display screen.

19. The computer-implemented method of claim 16, further comprising enabling navigation within the existing pages of the drawing surface without further expanding the drawing surface.

20. The computer-implemented method of claim 16, wherein the user input comprises:
  input to scroll past a boundary of the drawing surface; or
  a two-finger swipe on the drawing surface.

\* \* \* \* \*